United States Patent
Brenner et al.

(10) Patent No.: US 10,642,790 B1
(45) Date of Patent: May 5, 2020

(54) AGENTLESS VIRTUAL DISK METADATA INDEXING

(71) Applicant: EMC IP Holding Company LLC, Hopkinton, MA (US)

(72) Inventors: Adam Brenner, Lake Forest, CA (US); Jennifer Starling, Lake Forest, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 294 days.

(21) Appl. No.: 15/713,040

(22) Filed: Sep. 22, 2017

(51) Int. Cl.
| | | |
|---|---|---|
| *G06F 16/10* | (2019.01) | |
| *G06F 16/14* | (2019.01) | |
| *G06F 16/188* | (2019.01) | |
| *G06F 16/242* | (2019.01) | |
| *G06F 9/455* | (2018.01) | |

(52) U.S. Cl.
CPC .......... *G06F 16/144* (2019.01); *G06F 16/188* (2019.01); *G06F 16/2433* (2019.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 8,881,144 | B1* | 11/2014 | Banerjee | ................. G06F 9/461 718/1 |
| 2016/0078068 | A1* | 3/2016 | Agrawal | ............... G06F 16/215 707/692 |
| 2016/0266923 | A1* | 9/2016 | Miyoshi | .............. G06F 9/45558 |

* cited by examiner

*Primary Examiner* — Jau Shya Meng
(74) *Attorney, Agent, or Firm* — Chamberlain, Hrdlicka, White, Williams, & Aughtry (57) ABSTRACT

A method and system for implementing agentless virtual disk metadata indexing. Specifically, the disclosed method and system entails the parsing of data within a virtual machine and/or virtual disk snapshot to extract filesystem metadata information during data backup operations. Extraction of the filesystem metadata information is performed based on an understanding of a filesystem layout for a format in which the snapshot is defined, rather than based on the mounting and traversing of the snapshot. Furthermore, the extracted filesystem metadata information is encoded in a schema that may facilitate indexing of the information for use in a metadata searching and/or retrieval service.

12 Claims, 6 Drawing Sheets

AGENTLESS VIRTUAL DISK METADATA INDEXING

BACKGROUND

With the constant threat of cyber security attacks, data generated for backup, archiving, and/or disaster recovery is increasing at an alarming rate. Searching for and retrieving metadata describing the plethora of data is particularly painstaking.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every, other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to agentless virtual disk metadata indexing. Specifically, one or more embodiments of the invention entails the parsing of data within a virtual machine and/or virtual disk snapshot to extract filesystem metadata information during data backup operations. Extraction of the filesystem metadata information is performed based on an understanding of a filesystem layout for a format in which the snapshot is defined, rather than based on the mounting and traversing of the snapshot. One or more embodiments of the invention further entails encoding the extracted filesystem metadata information in a schema that may facilitate indexing of the information for use in a metadata searching and/or retrieval service.

Figure 1:
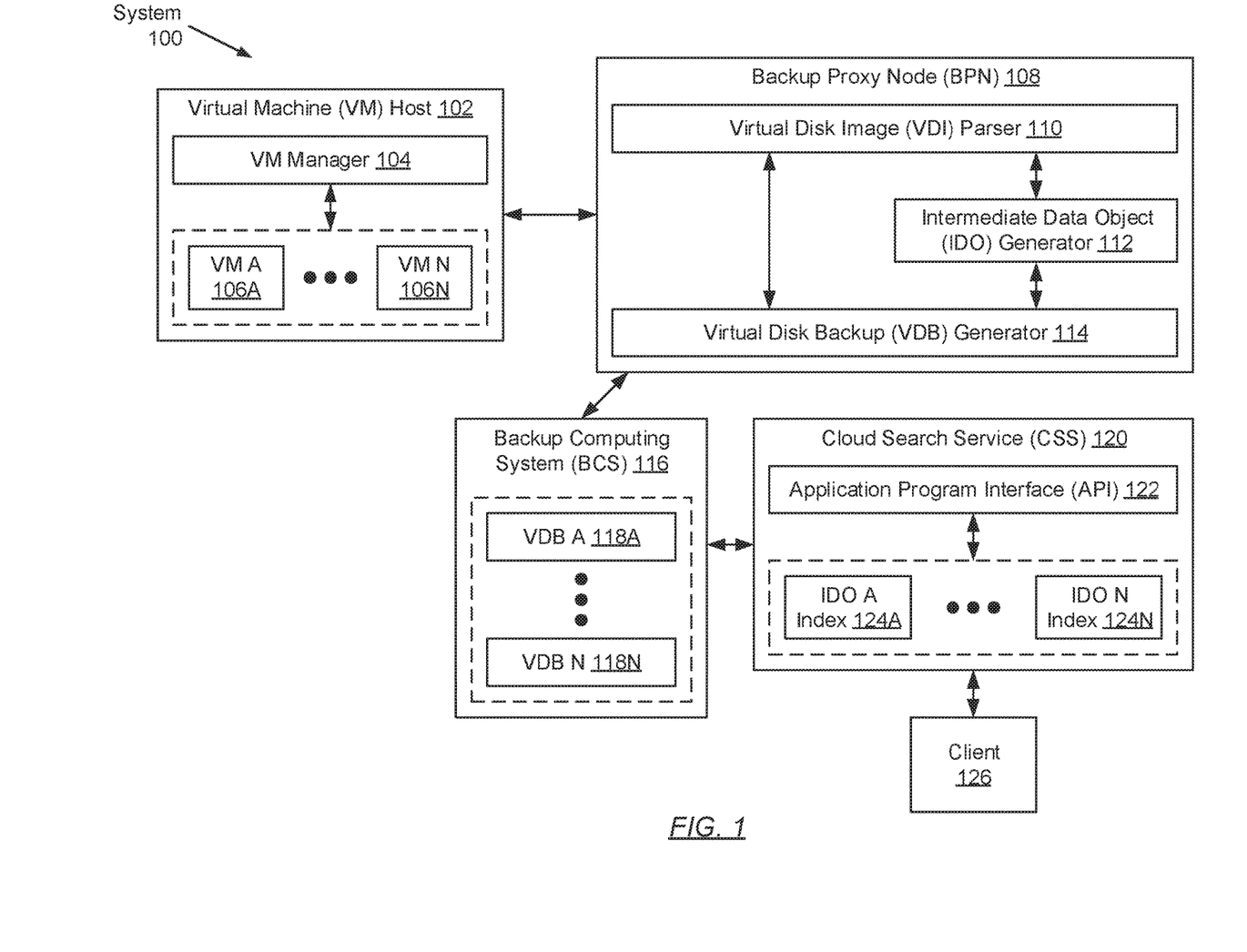
FIG. 1 shows a system in accordance with one or more embodiments of the invention.

FIG. 1 shows a system in accordance with one or more embodiments of the invention. The system (100) includes a virtual machine (VM) host (102) operatively connected to a backup proxy node (BPN) (108), which in turn may be operatively connected to a backup computing system (BCS) (116). The system (100) further includes a cloud search service (CSS) (120) operatively connected to the BCS (116) and a client (126). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that may facilitate communication and/or information exchange. Further, the aforementioned components may interact with one another using any combination of one or more wired and/or wireless communication protocols.

In one embodiment of the invention, the VM host (102) may be any computing system (see e.g., FIG. 5) on which on which one or more VMs (106A 106N) may be executing. A VM (106A-106N) may be a distinct operating environment configured to inherit underlying functionality of the host operating system (OS) (and access to the underlying host hardware) using an abstraction layer. Further, a VM (106A-106N) may include a separate instance of an OS, which may be distinct from the host OS. By way of an example, one or more embodiments of the invention may be implemented based on VMware® architecture, which may involve: (i) one or more VMs (106A-106N) executing on a host computer system (i.e., the VM host (102)) such that each VM (106A-106N) serves as a host to an instance of a guest OS; and (ii) a hypervisor layer (i.e., a VM manager (104)) serving to facilitate intra-host communication between the one or more VMs (106A-106N) and the host computer system (i.e., VM host (102)) hardware. VMware® is a registered trademark of VMware, Inc. Furthermore, examples of the VM host (102) include, but are not limited to, desktop computers, laptop computers, tablet computers, servers, mainframes, or a combination thereof.

In one embodiment of the invention, the VM host (102), or more specifically the VM manager (104), may include functionality to: (i) receive snapshot requests from the BPN (108); (ii) in processing snapshot requests, generate one or more virtual disk images (VDI) (described below) based on one or more VMs (106A-106N); and (iii) transmit generated VDIs back to the BPN (108) as responses to snapshot requests. One of ordinary skill will appreciate that the VM host (102) and/or VM manager (104) may perform other functionalities without departing from the scope of the invention.

In one embodiment of the invention, a VDI (not shown) may be an image-based snapshot of at least a partition of a virtual disk (not shown). That is, a virtual disk may be represented through one or more VDIs. Further, a virtual disk may be a software construct that emulates a physical disk device (e.g., an optical disc drive, a floppy disk drive, a hard disk drive, a tape drive, etc.). To other software (i.e., computer programs), a virtual disk thus identifies as and behaves like a physical disk device. In one embodiment of the invention, a VM (106A-106N) may implement one or more virtual disks in order to emulate the behavior of a physical machine or computing system. Moreover, a virtual disk and subsequently, a VDI, may store OSs, applications, and data used to execute a VM (106A-106N). This information may be organized within a. VDI in the form of, for example, a filesystem including a hierarchy of one or more files and folders. In one embodiment of the invention, a VDI may also capture the state (e.g., powered-on, powered-off, suspended, etc.) of a VM (106A-106N) at a given time (i.e., the moment the VDI is generated), and the underlying host hardware configuration (e.g., number of computer processors, amount of memory and persistent storage, number of network interface cards, etc.) allocated towards execution of the VM (106A-106N). Examples of VDI formats include, but are not limited to, the Virtual Disk Image (VDI) (not to be confused with the generic snapshot term disclosed herein) developed for Oracle Corporation's VM VirtualBox, the Virtual Machine Disk (VMDK) developed by VMware, Inc.; and the Virtual Hard Disk (VHD) developed by Microsoft Corporation and Connectix Corporation.

In one embodiment of the invention, the BPN (1.08) may be a hardware and/or software implemented VM backup and/or disaster recover (DR) service. The BPN (108) may be implemented on one or more servers (not shown). Each server may be a physical server (i.e., within a datacenter) or a virtual server (that may be cloud-based). In one embodiment of the invention, the BPN (108) may be implemented on one or more computing systems similar to the exemplary computing system shown in FIG. 5. Furthermore, the BPN (108) includes a. VDI parser (110), an intermediate data object (IDO) generator (112), and a virtual disk backup (VDB) generator (114). Each of these components is described below.

In one embodiment of the invention, the VDI parser (110) may be a computer program or a computer process (i.e., an instance of a computer program) executing on the underlying hardware of the BPN (108). Specifically, the VDI parser (110) may be a computer program/process dedicated towards the parsing of one or more VDIs (described above). Accordingly, the VDI parser (110) may include functionality to segment a VDI into one or more components, which may include, but are not limited to, a virtual disk data (VDD) component and a virtual disk metadata (VDM) component (described below). In one embodiment of the invention, the VDI parser (110) may include further functionality to: (i) issue snapshot requests to the VM host (102); (ii) receive one or more VDIs from the VM host (102) in response to snapshot requests; (iii) provide VDD to the VDB generator (114); and (iv) provide VDM to the IDO generator (112).

In one embodiment of the invention, and as mentioned above, VDD (not shown) may be a component of a VDI. More specifically, VDD may be representative of the raw data of a virtual disk stored in the VDI. The raw data may include, for example, the binary content (or sequence of bytes) contained in each sector of the virtual disk excluding any metadata. Further, the raw data may pertain to OSs and applications that had been executing on the virtual disk, and may further include relevant data files associated with the OSs and applications.

In one embodiment of the invention, and as mentioned above, VDM (not shown) may be another component of a VDI. More specifically, VDM may provide descriptive information relating to the filesystem(s) within the VDI. Subsequently, VDM may provide descriptive information associated with VDD, a virtual disk, and/or a VM (106A-106N). Examples of VDM for each file and folder within the VDI include, but are not limited to including, a full path of the file/folder, a size (in bytes) of the file/folder, the owner of the file/folder, a modification date associated with the file/folder, and other filesystem metadata.

In one embodiment of the invention, the IDO generator (112) may be a computer program or a computer process (i.e., an instance of a computer program) executing on the underlying hardware of the BPN (108). Specifically, the IDO generator (112) may be a computer program/process dedicated towards the generating of one or more IDOs. An IDO (not shown) may be a data file for storing VDM expressed in a schema that facilitates VDM indexing. By way of an example, an IDO may be a. Structured Query Language (SQL)ite relational database file. By way of another example, an IDO may be a JavaScript Object Notation (JSON) standard data interchange formatted file. Furthermore, in one embodiment of the invention, the IDO generator (112) may include functionality, to: (i) obtain VDM from the VDI parser (110); (ii) create an IDO using or based on the obtained VDM; and (iii) providing created IDOs to the VDB generator (114).

In one embodiment of the invention, the VDB generator (114) may be a computer program or a computer process (i.e., an instance of a computer program) executing on the underlying hardware of the BPN (108). Specifically, the VDB generator (114) may be a computer program/process dedicated towards the generating of one or more VDBs (118A-118N) (described below). Accordingly, the VDB generator (114) may include functionality to: (i) obtain VDD (described above) from the VDI parser (110); (ii) obtain one or more IDOs (described above) from the IDO generator (112); (iii) create one or more VDBs (118A-118N) using or based on at least the obtained VDD and IDOs; and (iv) provide/transmit one or more VDBs (118A-118N) to the BCS (116).

In one embodiment of the invention, the BCS (116) may be a data backup, archiving, and/or disaster recovery (DR) storage system. The BCS (116) may be implemented on one or more servers (not shown). Each server may be a physical server (i.e., within a datacenter) or a virtual server (that may be cloud-based). In one embodiment of the invention, the BCS (116) may be implemented on one or more computing systems similar to the exemplary computing system shown in FIG. 5. In one embodiment of the invention, the BCS (116) may be implemented using any type of storage unit and/or device (e.g., a filesystem, a database, a collection of tables, or any other storage mechanism). In such an embodiment, the BCS (116) may further be implemented using multiple storage units and/or devices, which may or may not be of the same type or located at the same physical site. Furthermore, the BCS (116) may be a storage system that is tape-based, disk-based, flash-based, based on any other media, or a combination thereof. In one embodiment of the invention, the BCS (116) may include persistent storage. Examples of persistent storage that may be hosted on the BCS (116) include, but are not limited to including, optical storage, magnetic storage, NAND Flash Memory, NOR Flash Memory, Magnetic Random Access Memory (M-RAM), Spin Torque Magnetic RAM (ST-MRAM), Phase Change Memory (PCM), and any other memory defined as a non-volatile Storage Class Memory (SCM).

In one embodiment of the invention, the BCS (116) may be configured to store one or more VDBs (118A-118N). A VDB (118A-118N) may be a backup, archiving, or DR pertinent data object. The VDB (118A-118N) may include raw data (i.e., VDD) and metadata (i.e., VDM or an IDO) associated with a virtual disk and/or a VM (106A-106N). One of ordinary skill will appreciate that the BCS (116) may be configured to store various other data without departing from the scope of the invention. Furthermore, in one embodiment of the invention, the BCS (116) may include functionality to transform any data stored therein. For example, the BCS (116) may include functionality to apply one or more deduplication, compression, and/or encryption techniques to more efficiently store data. Moreover, the BCS (116) may include further functionality to: (i) receive one or more VDBs (118A-118N) from the BPN (108); (ii) receive IDO restore requests from the CSS (120); (iii) in processing IDO restore requests, extracting one or more IDOs from one or more VDBs (118A-118N); and (iv) transmit extracted IDOs back to the CSS (120).

In one embodiment of the invention, the CSS (120) may be a hardware and/or software implemented service that enables fast, scalable search and analysis of backup, archiving, and/or DR data. The CSS (120) may be implemented on one or more servers (not shown). Each server may be a physical server within a datacenter) or a virtual server (that may be cloud-based). In one embodiment of the invention, the CSS (120) may be implemented on one or more computing systems similar to the exemplary computing system shown in FIG. 5. Furthermore, the CSS (120) includes an application program interface (API) (122) and one or more IDO indices (124A-124N). Each of these components is described below.

In one embodiment of the invention, the API (122) may be a hardware and/or software implemented construct that employs a set of subroutine definitions, protocols, and/or tools for implementing a specification for the exchange of information between the CSS (120) and the client (126), or between the CSS (120) and the BCS (116). For example, the API (122) may establish that the exchange of information may entail a request for processing and a return of a response, if any, based on the outcome of the processing. The API (122) may further include any logic necessary to: (i) issue IDO restore requests to the BCS (116); (ii) receive one or more IDOs from the BCS (116) as responses to IDO restore requests; (iii) process received IDOs to generate one or more IDO indices (124A-124N); (iv) store generated IDO indices (124A-124N) on the CSS (120); (v) receive search queries from the client (126); (vi) in processing the search queries, use one or more IDO indices (124A-124N) to identify sought information (i.e., search results); and (vii) transmit search results back to the client (126) as responses to search queries. By way of an example, the API (122) may be a web API accessed through a webpage and/or a web browser, and a WAN (e.g., Internet) connection.

In one embodiment of the invention, an IDO index (124A-124N) may be a data structure that facilitates the efficient search and/or retrieval of data (e.g., VDD, VDM, etc.) from the BCS (116). An IDO index (124A-124N) may be generated through the processing of an IDO, where the processing may entail the building of a full path for each file and/or folder specified in the filesystem contained in a VDI (not shown), and subsequently, a VDB (118A-118N). A full path may refer to a unique location in the aforementioned filesystem where a file or folder resides. Furthermore, in one embodiment of the invention, an IDO index (124A-124N), as mentioned above, may be traversed in response to search queries presented by the client (126). The traversing may or may not yield the desired search results (or the information sought by the search queries).

In one embodiment of the invention, the client (126) may be any computing system (see e.g., FIG. 5) that includes functionality to submit search queries to the CSS (120). The client (126) may include further functionality to receive search results, as responses to submitted search queries, from the CSS (120). In one embodiment of the invention, the client (126) may be a computing system associated with an entity or one or more individuals with which the VM host (102) is associated. Examples of the client (126) may include, but is not limited to including, a desktop computer, a laptop computer, a tablet computer, a server, a mainframe, a smartphone, any other computing system, or a combination thereof.

While FIG. 1 shows a configuration of components, other system configurations may be used without departing from the scope of the invention. For example, the system (100) may include multiple (not just one as depicted) VM hosts (102) operatively connected to the BPN (108), as well as multiple clients (126) and BCSs (116) operatively connected to the CSS (120).

Figure 2:
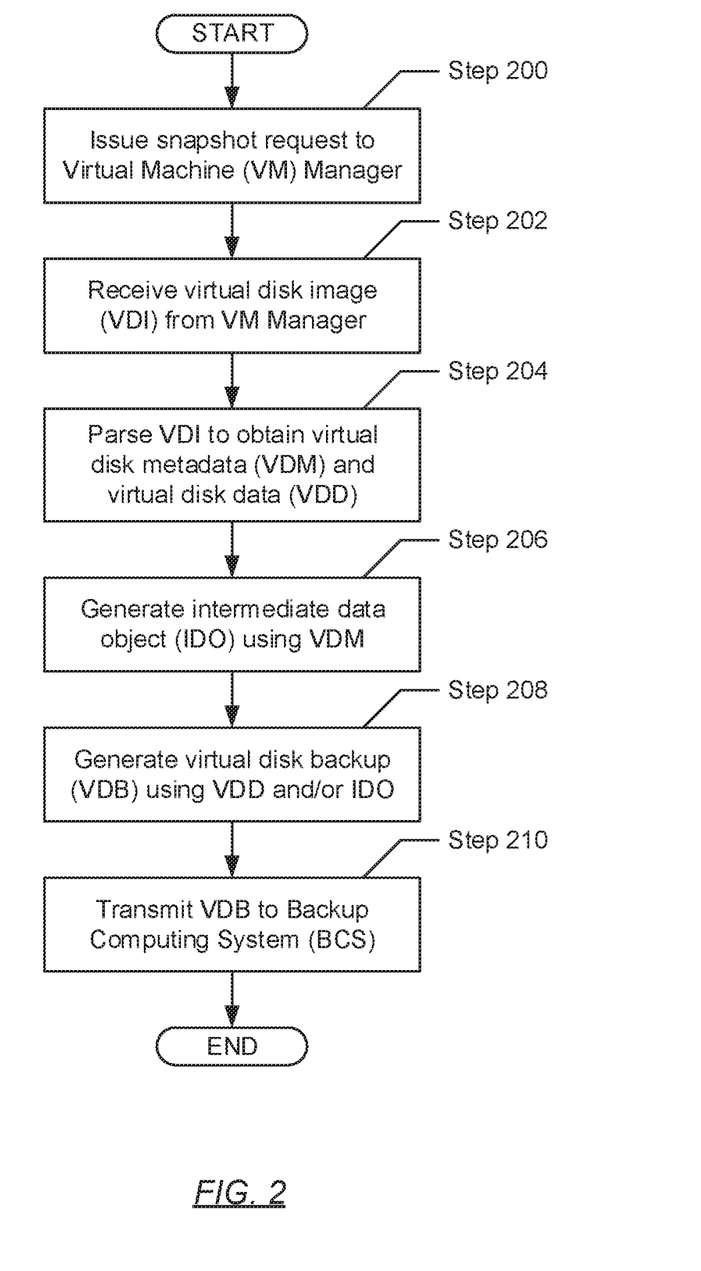
FIG. 2 shows a flowchart describing a method for generating a virtual disk backup in accordance with one or more embodiments of the invention.

FIG. 2 shows a flowchart describing a method for generating a virtual disk backup in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 2 may be performed in parallel with any other steps shown in FIG. 3 without departing from the scope of the invention.

Turning to FIG. 2, in Step 200, a snapshot request is issued to a virtual machine (VM) host, or more specifically, to a VM manager executing on the VM host. In one embodiment of the invention, the snapshot request may pertain to obtaining an exact copy of one or more virtual disks associated with a VM executing on the VM host. The exact copy (or snapshot) may preserve the state (e.g., powered-on, powered-off, suspended, etc.), virtual disk data, and configuration (e.g., allocated computing resources) of the VM (stored within those one or more virtual disks) at a given point in time. Further, in one embodiment of the invention, the snapshot request may include a unique VM identifier or one or more unique virtual disk identifiers, which may identify the VM or one or more virtual disks, respectively, executing on the VM host for which a snapshot is sought.

In Step 202, one or more virtual disk images (VDIs) is/are received from the VM host/manager. In one embodiment of the invention, a VDI may be an image-based snapshot of at least a partition of a virtual disk. Consequently, a virtual disk may be represented through a set of one or more VDIs, whereas a VM, which employs one or more virtual disks, may be represented through one or more sets of one or more VDIs. Furthermore, the received VDI(s) may correspond to the unique VM identifier or one or more unique virtual disk identifiers submitted with the snapshot request (issued in Step 200).

In Step 204, the one or more VDIs (received in Step 202) is/are parsed. Specifically, in one embodiment of the invention, the VDI(s) may undergo parsing to segregate the virtual disk metadata (VDM) from the virtual disk data (VDD) stored within each VDI. As described above, VDD may refer to the raw data contained in a virtual disk, whereas VDM may refer to information that describes (or places context on) the raw data and/or filesystem(s) within the virtual disk. Further, in one embodiment of the invention, parsing of a VDI into VDD and VDM may entail an understanding of the filesystem layout associated with the format in which the VDI is received. A filesystem layout may be a specification defining the directory structure and directory contents for a filesystem hierarchy of a particular format. Examples of VDI formats include, but are not limited to, the VDI format from the Oracle Corporation, the VMDK format from VMware, Inc., and the VHD format from the Microsoft Corporation and Connectix Corporation.

In Step 206, one or more intermediate data objects (IDOs) is/are generated. In one embodiment of the invention, the IDO(s) may be generated using or based on the VDM (obtained in Step 204). Particularly, generation of an IDO may entail the encoding (or re-structuring) and storing of VDM into a schema that facilitates indexing. Examples of schema that which an IDO may follow may include, but is not limited to including, the SQLite relational database schema and the JSON standard data interchange schema.

In Step 208, one or more virtual disk backups (VDBs) is/are generated. In one embodiment of the invention, the VDB(s) may be generated using or based on the IDO(s) (generated in Step 206). In another embodiment of the invention, the VDB(s) may be generated further using or based on the VDD (segregated from the VDI(s) in Step 204). Moreover, generation of a VDB may entail the encoding and storing of the VDD and/or the IDO(s) into a schema that facilitates archiving and/or disaster recovering/restoring. Examples of schema that which a VDB may follow may include, but is not limited to including, the VMDK schema from VMware, Inc., the VHD schema from the Microsoft Corporation and Connectix Corporation, the open-source Tape ARchive (TAR) archiving standard schema, the open-source Portable Archive Exchange (PAX) archiving standard schema, and the Common Data Streaming Format (CDSF) used by Dell EMC. In Step 210, the VDB(s) (generated in Step 208) is/are subsequently transmitted to the backup computing system (BCS) (see e.g., FIG. 1).

Figure 3:
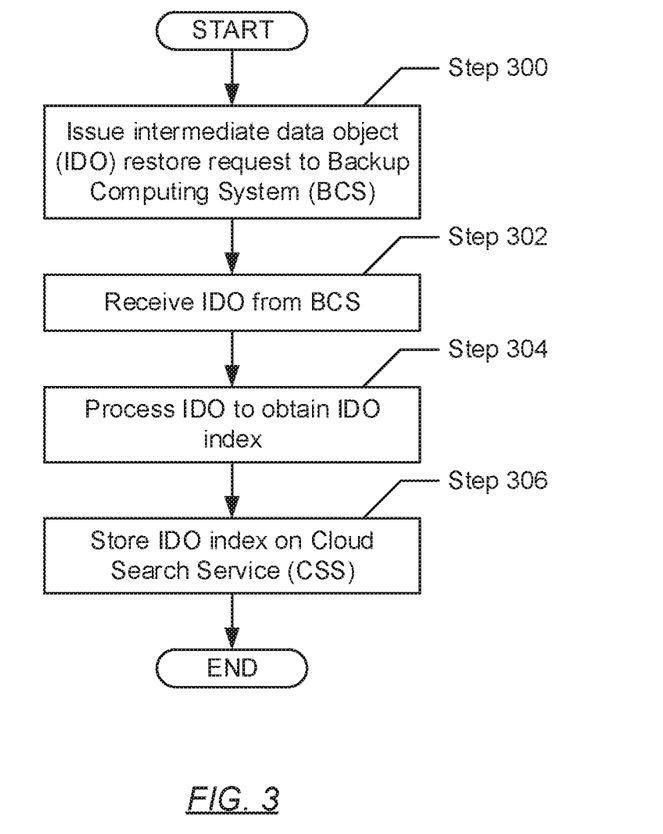
FIG. 3 shows a flowchart describing a method for indexing virtual disk metadata in accordance with one or more embodiments of the invention.

FIG. 3 shows a flowchart describing a method for indexing virtual disk metadata in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 3 may be performed in parallel with any other steps shown in FIG. 2 without departing from the scope of the invention.

Turning to FIG. 3, in Step 300, an intermediate data object (IDO) restore request is issued to the backup computing system (BCS). In one embodiment of the invention, the IDO restore request may pertain to obtaining one or more IDOs extracted from one or more virtual disk backups (VDBs) (described above) stored on the BCS. As mentioned above, an IDO may include virtual disk metadata (VDM) referring to information that describes (or places context on) the raw data and/or filesystem(s) within one or more virtual disks associated with a virtual machine (VM). Further, the IDO restore request may include a unique VM identifier, one or more unique virtual disk identifiers, or one or more unique VDB identifiers for identifying which IDO(s) associated with a. VM, one or more virtual disks, or one or more VDBs is/are sought. Moreover, in one embodiment of the invention, the IDO restore request may be issued after the receiving of a completion notification from the BCS (418). In such an embodiment, the aforementioned completion notification may serve to inform that one or more VDBs has/have been successfully stored on the BCS (418). Alternatively, in another embodiment of the invention, the IDO restore request may be issued based on a programmable polling (or querying) schedule for retrieving MOs.

In Step 302, one or more IDOs is/are received from the BCS. In one embodiment of the invention, the IDO(s) may correspond to the unique VM identifier, one or more unique virtual disk identifiers, or one or more unique VDB identifiers submitted with the IDO restore request (issued in Step 300).

In Step 304, the IDO(s) (received in Step 302) is/are processed. Specifically, in one embodiment of the invention, the IDO(s) may undergo processing to obtain one or more IDO indices. As described above, an IDO index may be a data structure that facilitates the efficient search and/or retrieval of data (e.g., virtual disk data (VDD), VDM, etc.) stored within VDBs on the BCS. The aforementioned data may be represented in the form of, for example, a filesystem including a hierarchy of one or more files and folders. Subsequently, in one embodiment of the invention, processing of an IDO to obtain an IDO index may entail the building of a full path for each file and/or folder specified in the filesystem, where a full path may refer to a unique location in the aforementioned filesystem where a file or folder resides.

In Step 306, the one or more IDO indices (obtained in Step 304) is/are stored on a cloud search service (CSS). A CSS may be a hardware and/or software implemented service that enables fast, scalable search and analysis of backup, archiving, and/or DR data (see e.g., FIG. 1). In one embodiment of the invention, stored IDO indices may be efficiently traversed in response to search queries submitted by clients, thereby leading to the presentation of search results for VM and/or virtual disk data and/or metadata.

Figure 4A:
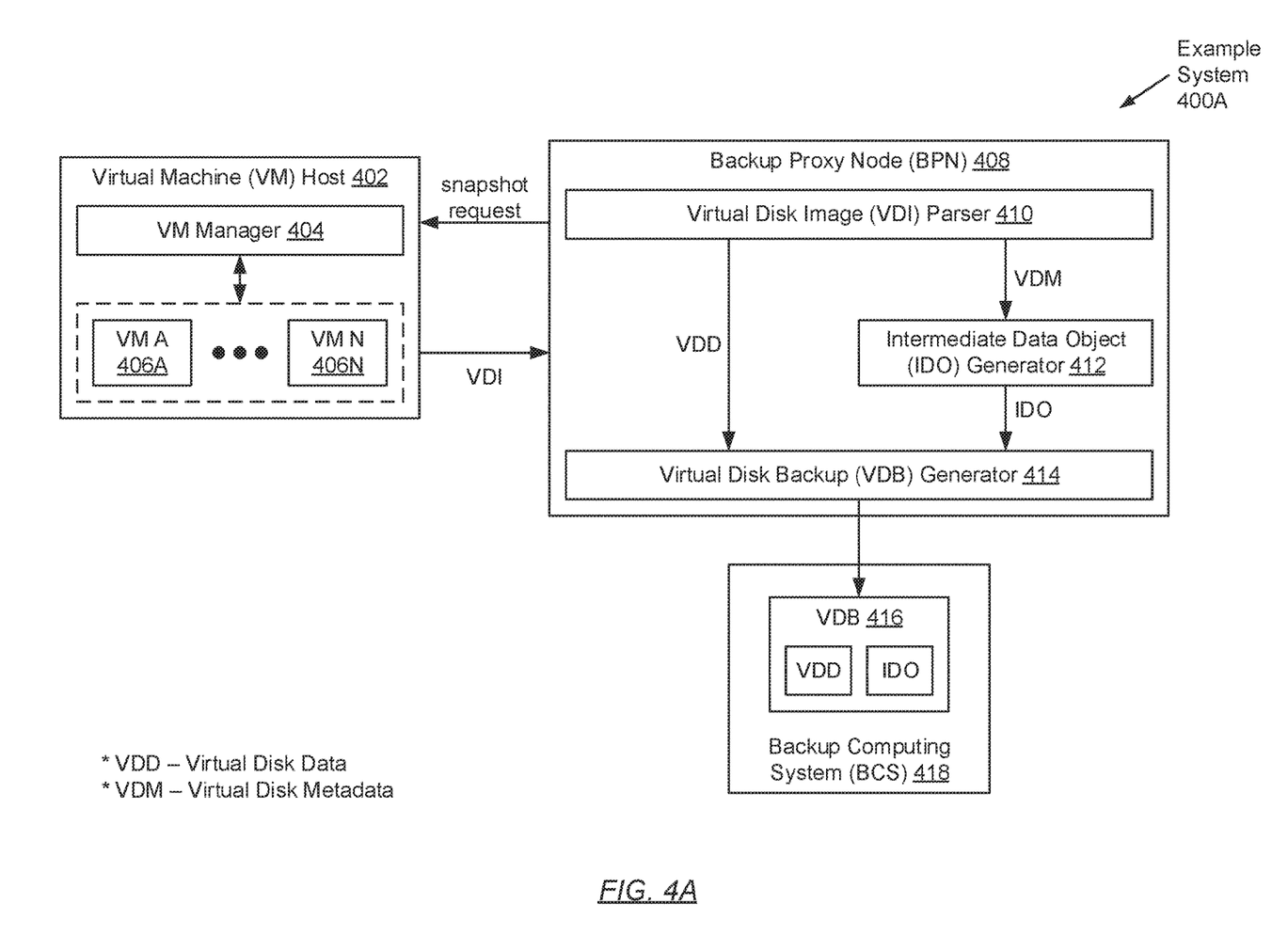
FIGS. 4A and 4B each show an example system in accordance with one or more embodiments of the invention.
Figure 4B:
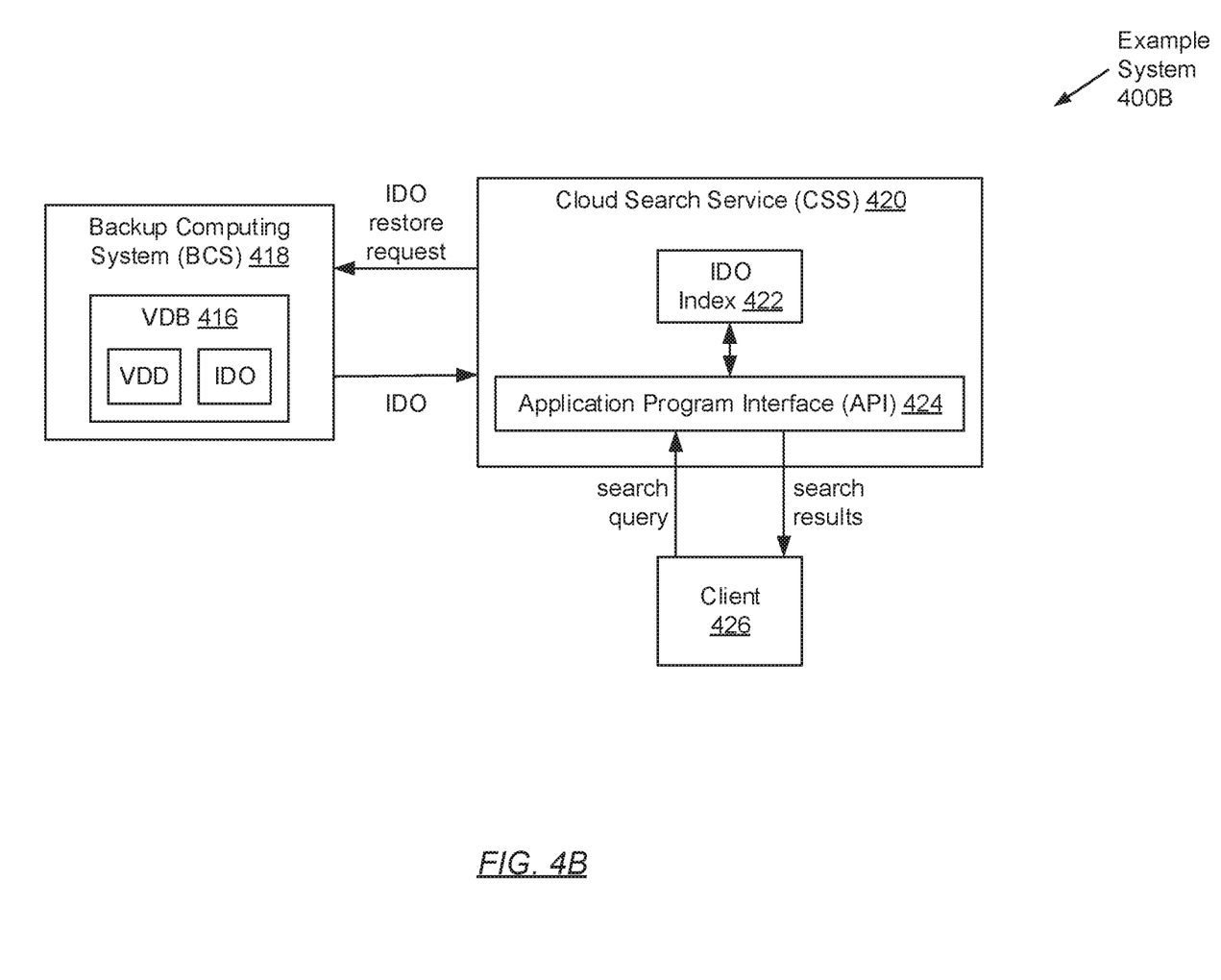

FIGS. 4A and 4B each show an example system in accordance with one or more embodiments of the invention. The following examples, presented in conjunction with components shown in FIGS. 4A and/or 4B, are for explanatory purposes only and not intended to limit the scope of the invention.

Example 1: VDI Parsing

Turning to FIG. 4A, the portrayed example system (400A) includes a VM host (402) operatively connected to a BPN (408), which in turn is operatively connected to a BCS (418). Further, the VM host (402) includes a VM manager (404) and one or more VMs (406A-406N) executing thereon. The BPN (408) includes a VDI parser (410), an IDO generator (412), and a VDB generator (4:14). Meanwhile, the BCS (418) may store one or more VDBs (416).

Turning to the example, consider a scenario whereby the scheduled backup of VMs executing on the VM host (402) is underway. Accordingly, towards fulfilling the scheduled backup, the VDI parser (410) on the BPN (408) issues a snapshot request for each VM (406A-406N) executing on the VM host (402). In each snapshot request, a unique VIM identifier associated with one of the VMs (406A-406N) is included. Further, each snapshot request is submitted to the VM manager (404) executing on the VM host (402). Upon receiving a snapshot request, the VM manager (404) generates one or more VDIs, which are representative of image-based exact copies of one or more virtual disks that, at least in part, implement a VM (406A-406N). Further, in response to each snapshot request received, the VM manager (404) transmits the generated VDI(s) back to the BPN (408).

Thereafter, for each snapshot request submitted earlier, the VDI parser (410) obtains a set of VDIs from the VM manager (404). The VDI parser (410) subsequently parses each obtained VDI. Parsing of each VDI may entail segregating the VDD and VDM components from the VDI using an understanding of the filesystem layout associated with the format in which the VDI is received. After parsing each VDI, the VDI parser (410) forwards the VDD to the VDB generator (414) while forwarding the VDM to the IDO generator (412). In receiving VDM from the VDI parser (410), the IDO generator (4:1.2) encodes (or re-structures) the VDM to obtain one or more IDOs. Each IDO may present/store VDM information in a schema that facilitates indexing see e.g., Example 2 below). Once the IDO(s) is/are generated, the IDO generator (412) subsequently forwards the IDO(s) to the VDB generator (414).

With the receiving of VDD from the VDI parser (410) and the IDO(s) from the IDO generator (412) for each VDI, the VDB generator (414) encodes the VDD and IDO(s) in another schema to obtain a VDB (416). The schema in which the VDB (416) is encoded may facilitate the archiving and/or disaster recovering/restoring of the information stored in corresponding VDD and IDO(s). After generating the VDB (416), the VDB generator (414) transmits the VDB (416) to the BCS (418), whereon the VDB (416) is subsequently stored.

Example 2: IDO Indexing

Turning to FIG. 4B, the portrayed example system (400B) includes a BCS (418) operatively connected to a CSS (420), which in turn is operatively connected to a client (426). Further, the BCS (418) stores one or more VDBs (416) while the CSS (420) stores one or more IDO indices (422) and includes an API (424) with which the BCS (418) and the client (426) may interact with the CSS (420).

Turning to the example, consider a continuation to the scenario presented in Example 1 above. Substantively, assume that a VDB (416) has been stored on the BCS (418) per the scheduled backup of VM information for one or more VMs executing on a VM host (not shown). At this point, the API (424) on the CSS (420) issues an IDO restore request to the BCS (418). The API (424) may issue the IDO restore request after receiving a completion notification from the BCS (418), or alternatively, based on a polling schedule for the retrieval of IDOs programmed into the CSS (420). Further, the IDO restore request includes a unique VDB identifier belonging to the VDB (416) stored on the BCS (418).

Upon receiving the IDO restore request from the API (424), the BCS (418) identifies the VDB (416) stored thereon associated with the unique VDB identifier enclosed in the IDO restore request. Thereafter, the BCS (418) extracts the IDO stored within the VDB (416) and transmits the extracted IDO back to the CSS (420). In obtaining the IDO from the BCS (418), the API (424) on the CSS (420) processes the IDO to obtain an IDO index (422). Processing of the IDO may entail the indexing of, or the building of a full path for each file and/or folder specified in the filesystem stored in, the IDO. After the indexing, the API (424) subsequently stores the obtained IDO index (422) on the CSS (420).

At any given time after storing the IDO index (422), the API (424) may employ the IDO index (422) to efficiently search for and/or retrieve specific VM related information sought by a search query from the client (426). Upon completion of the searching, and granted the sought VM related information is available, the API (424) presents the sought VM related information as search results to the client (426).

Figure 5:
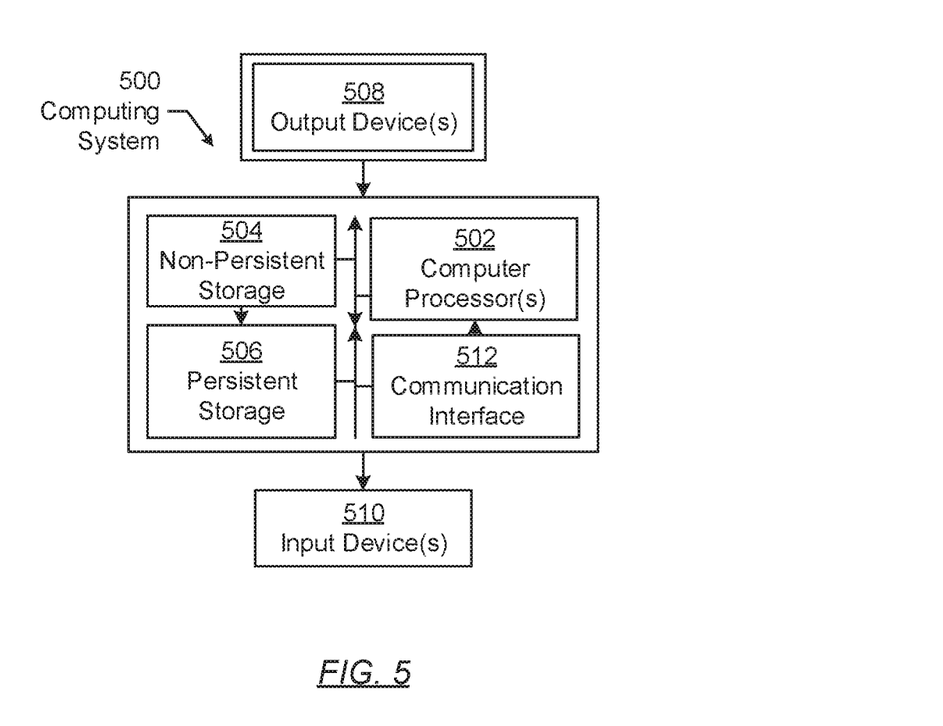
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other Output device. One or more of the output devices may be the same as or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention provide a method and system for implementing agentless virtual disk metadata indexing. To that effect, one or more embodiments of the invention may be advantageous over existing approaches for extracting and indexing VM and/or virtual disk metadata during data backup operations at least because: (i) embodiments of the invention do not require the installation of agents (i.e., computer processes that implement VM backup, archiving, and/or disaster recovery operations) on VMs; (ii) embodiments of the invention do not require the mounting and traversing of a snapshot to extract metadata—mounting/traversing increases the amount of time expended for backing up the VM and/or virtual disk; (iii) embodiments of the invention enable the generation of an IDO to be performed in parallel with the generation of a VDB—parallelizing these processes minimizes the impact on the overall time required for backup operations; and (iv) embodiments of the invention enable the generation of IDOs on a proxy node (e.g., the BPN), which simplifies deployment, upgrades, and ongoing maintenance.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be hunted only by the attached claims.

What is claimed is:

1. A method for obtaining virtual disk metadata (VDM), comprising:
   issuing a snapshot request comprising a virtual machine (VM) identifier;
   receiving, in response to the snapshot request, a virtual disk image (VDI) for a virtual disk associated with the VM identifier;
   parsing the VDI based on a filesystem layout for a format in which the VDI is received, wherein the filesystem layout is for a filesystem;
   obtaining, from parsing the VDI, virtual disk data (VDD) and the VDM for the virtual disk;
   generating an intermediate data object (IDO) using the VDM;
   processing the IDO by building a full path for each directory and for content within each directory for the filesystem to obtain an IDO index, wherein the IDO index comprises a data structure in which the full path is stored; and
   employing the IDO index to implement a VDM searching service.

2. The method of claim 1, wherein the VM identifier is associated with a VM implemented using at least the virtual disk.

3. The method of claim 1, wherein the VDI comprises the filesystem storing the VDD and the VDM, wherein the VDD comprises raw data in the filesystem, wherein the VDM comprises metadata describing the filesystem.

4. The method of claim 1, further comprising:
   prior to processing of the IDO:
      generating a virtual disk backup (VDB) using the VDD and the IDO; and
      storing the VDB in backup storage wherefrom the IDO of the VDB is retrieved for processing.

5. The method of claim 1, wherein generating the IDO comprises encoding the VDM according to a schema, wherein the schema is based on a structured query language (SQL)ite relational database file format.

6. A system, comprising:
   a virtual machine (VM) manager and backup storage;
   a backup proxy node (BPN) operatively connected to the VM manager and the backup storage, and programmed to:
      issue, to the VM manager, a snapshot request comprising a VM identifier;
      receive, from the VM manager and in response to the snapshot request, a virtual disk image (VDI) relating to a virtual disk associated with the VM identifier;
      parse the VDI based on a filesystem layout for a format in which the VDI is received, wherein the filesystem layout is for a filesystem;
      obtain, from parsing the VDI, virtual disk data (VDD) and virtual disk metadata (VDM) for the virtual disk;
      generate an intermediate data object (IDO) using the VDM; and
      store, in the backup storage, a virtual disk backup (VDB) comprising the VDD and the IDO, and
   an application programming interface (API) operatively connected to the backup storage, and programmed to:
      issue, to the backup storage, a restore request comprising the VM identifier;
      receive the IDO, extracted from the VDB, from the backup storage and in response to the restore request;
      process the IDO by building a full path for each directory and for content within each directory for the filesystem to obtain an IDO index, wherein the IDO index comprises a data structure in which the full path is stored; and
      employ the IDO index to implement a VDM searching service.

7. The system of claim 6, further comprising:
   a cloud search service (CSS) comprising the API; and
   a VM host comprising the VM manager and at least one VM.

8. A non-transitory computer readable medium (CRM) comprising computer readable program code, which when executed by a computer processor, enables the computer processor to:
   issue a snapshot request comprising a virtual machine (VM) identifier;
   receive, in response to the snapshot request, a virtual disk image (VDI) for a virtual disk associated with the VM identifier;
   parse the VDI based on a filesystem layout for a format in which the VDI is received, wherein the filesystem layout is for a filesystem; and
   obtain, from parsing the VDI, virtual disk data (VDD) and the VDM for the virtual disk;
   generate an intermediate data object (IDO) using the VDM;
   process the IDO by building a full path for each directory and for content within each directory for the filesystem to obtain an IDO index, wherein the IDO index comprises a data structure in which the full path is stored; and
   employ the IDO index to implement a VDM searching service.

9. The non-transitory CRM of claim 8, wherein the VM identifier is associated with a VM implemented using at least the virtual disk.

10. The non-transitory CRM of claim 8, wherein the VDI comprises the filesystem storing the VDD and the VDM, wherein the VDD comprises raw data in the filesystem, wherein the VDM comprises metadata describing the filesystem.

11. The non-transitory CRM of claim 8, comprising computer readable program code, which when executed by the computer processor, further enables the computer processor to:

prior to processing of the IDO:
    generate a virtual disk backup (VDB) using the VDD and the IDO; and
    store the VDB in backup storage wherefrom the IDO of the VDB is retrieved for processing.

12. The non-transitory CRM of claim 8, wherein generating the IDO comprises encoding the VDM according to a schema, wherein the schema is based on a structured query language (SQL)ite relational database file format.

* * * * *